Nov. 17, 1964    N. C. MOORE    3,157,722
METHOD OF MAKING REINFORCED REFRACTORY BODIES
Filed Dec. 28, 1960

3,157,722
METHOD OF MAKING REINFORCED REFRACTORY BODIES
Norman C. Moore, Greens Norton, England, assignor to The Plessey Company Limited, London, England, a British company
Filed Dec. 28, 1960, Ser. No. 79,080
Claims priority, application Great Britain, Jan. 6, 1960, 465/60
4 Claims. (Cl. 264—266)

This invention relates to methods of producing refractory bodies by the ejection, or projection of, particles or droplets of molten refractory material onto a suitably prepared surface. It is known to form bodies of refractory material by depositing layers of the material onto a prepared surface so as to build up the required body. Layers of refractory material are deposited by projecting molten droplets or particles of the refractory material onto the surface to be coated so that the droplets solidify on contact with the surface. If such a coating is deposited onto a prepared combustible base, for example graphite, which is subsequently removed for example by an oxidation process a porous refractory shape may be prepared which has the same profile as the base material.

One such method of projecting the molten particles or droplets is known as flame spraying. In this process the refractory material is fed into the flame of a flame spray gun wherein the material is melted and is carried along with the flame towards the surface against which the flame is directed.

It has been found that cooling occurs very rapidly and in consequence little flow of the refractory material can occur before solidification, and the resulting coating has been found to be somewhat porous.

In my earlier specification (reinforced ceramic material British patent specification No. 947,576) we have described methods by means of which a refractory body is reinforced by the introduction of foreign bodies of a metal or non-metal nature. In particular we have described the inclusion of metal fibres, silicon nitride whiskers and metal wire.

Broadly according to a first aspect of the present invention there is provided a ceramic body which is reinforced by a continuous length of metal wire integrally united with the ceramic body during the formation thereof.

Broadly according to a further aspect of the present invention there is provided a method of forming a reinforced ceramic refractory body by projecting molten particles or molten droplets of the refractory materials onto a suitably prepared and shaped surface, whilst simultaneously winding a metal wire onto the deposited refractory material so that the wire becomes embedded into the material.

Figure 1:
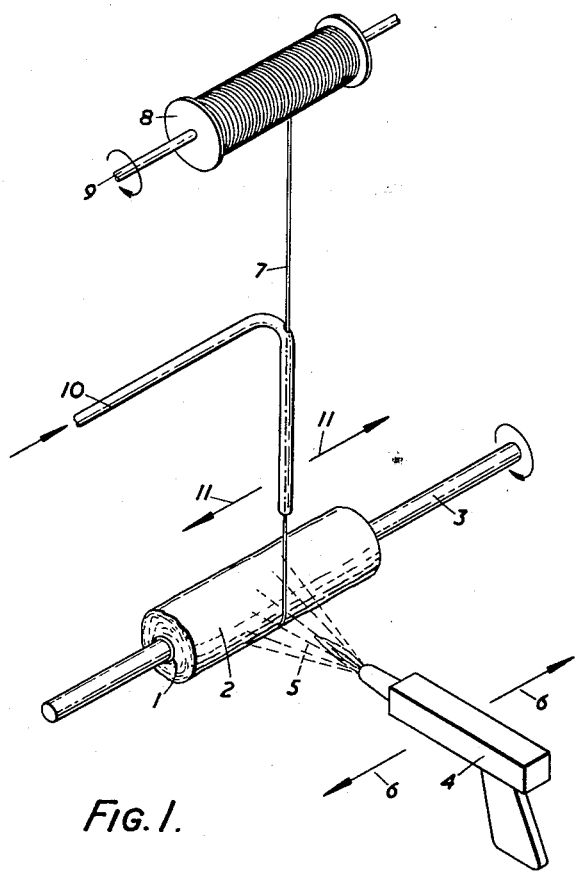
Figures 2, 3:
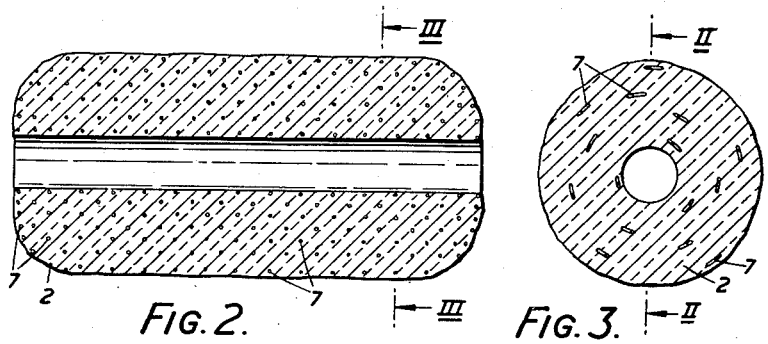

For a better understanding of the invention one method of forming a cylindrical body having a spirally wound metal wire reinforcement will be described in greater detail in relation to the accompanying drawings, in which
FIGURE 1 schematically illustrates the method, and
FIGURES 2 and 3 are sections of a reinforced ceramic body, FIGURE 2 being a section on a line II—II of FIGURE 3 and FIGURE 3 being a section on the line III—III of FIGURE 2.

A cylinder 1 having an external diameter substantially equal to the required internal diameter of the cylindrical ceramic body 2 is formed from a wire gauze, for example of stainless steel with 40 mesh. The cylinder 1 is mounted on a suitable mandrel or other rotatable support 3 for rotating the wire cylinder 1 about its longitudinal axis, at a predetermined speed. The means for rotating the mandrel is not shown. One suitable means is a lathe, turntable, or electric motor with a suitable chuck for gripping the mandrel.

In the present instance it will be presumed that it is desired to form a refractory body of alumina. If this is the case an initial coating of alumina, i.e. a thin layer (not shown) of alumina powder in a suitable binder is applied to the wire cylinder 1 so as to fill the interstices of the wire gauze former. The ceramic material to be sprayed is projected towards the thus prepared gauze by means of a flame spray gun 4 or any other mthod of particle projection for example a plasma spray gun or other means for introducing the ceramic particles into the flame. The wire gauze former is progressively rotated and the spray gun flame 5 is simultaneously reciprocated longitudinally of the former as indicated by the arrows 6 so as to obtain an even deposit of alumina. Simultaneously wtih the movement of the spray gun 4 and the rotation of the wire gauze former 1 a continuous length of metal wire 7, for example tungsten wire, is wound on to the former. The winding-on of the wire is such that the wire engages with the former or the previously deposited layers of the alumina prior to being subjected to the effects of the hot flame. The wire 6 is fed from a suitably positioned bobbin 8, which latter is rotatably mounted in a support 9.

The process is continued until a desired thickness of the refractory body 2 is obtained and also the requisite number of turns or layers of the wire 7.

The wire 7 is fed through a tube 10 through which an inert gas, for example argon, is flowing thereby preventing any oxidisation of the wire 7 prior to its being subjected to the effects of the spray gun. The tube is progressively reciprocated in unison with the gun so that the wire is always fed into the flame 5.

The direction of reciprocation is shown at 11.

After the refractory body has been formed it is removed from the mandrel. The wire gauze 1 can be removed by any convenient manner for example by a chemical process or a grit blasting process.

The refractory body 2 thus formed is reinforced by the wire 7. In addition, the wire 7 can serve for a second purpose for example as a resistance wire or as the turns of an inductance coil, thereby providing a resistance or inductance which may be used at high temperatures.

In the case of the spraying of the alumina, the spraying conditions can be such that the finished refractory body is in a metastable state for example in the gamma form or in the stable state that is the alpha form.

It will be appreciated that by changing the diameter of the wire or the type of wire during the formation of the refractory body it is possible to form refractory bodies having different reinforcement characteristics and/or different electrical properties at different sections thereof.

Furthermore, the metal wire can be wholly or partly replaced by means of metallic or non-metallic whiskers which have been produced in the form of a spun thread. In the earlier specification already referred to the term whisker has been explained.

In contrast to the formation of a cylindrical or other body of revolution which may be formed by a winding or rotary action of the mandrel 3 it is possible to reinforce flat plates by laying the wire reinforcement backwards and forwards across the plate as it is being formed so as effectively to form an extended layer of the wire in at least one plane of the plate.

Furthermore, it is possible to move the wire guide that is the tube 10 so that the wire 7 can be laid onto the body 2 being formed in accordance with certain wire laying formations, such as; one which is helically arranged with respect to the axis of the body being formed; an Archimedian type wire in the case where the body being formed is a surface of revolution such as for example a hemisphere or a hemisphere concated cone or the like.

If desired more than one wire could be laid simultaneously onto the body being formed.

If desired more than one spray gun can be used in the formation of the body.

What I claim is:

1. A process for making a ceramic refractory body including mechanical reinforcement consisting of fibrous material comprising the steps of heat spraying a fusible ceramic material so that it becomes deposited in a substantially unchanged chemical condition onto a former and simultaneously incorporating therewith the fibrous material in the form of a filament allowing the ceramic to cool and solidifying, and subsequently removing resulting refractory body from former.

2. A process as claimed in claim 1 in which at least part of the fibrous material is a metal wire.

3. A process as claimed in claim 2 in which the metal wire is protected from atmospheric oxidation by means of a non-oxidising gas stream before it is incorporated in the ceramic body.

4. A process for making a ceramic refractory body of alpha alumina including mechanical reinforcement consisting of fibrous material comprising the steps of heat spraying alumina onto a former and simultaneously incorporating therewith the fibrous material in the form of a filament, allowing the deposited ceramic to cool at such a rate that the alumina remains in the alpha form, and removing resulting body of alpha alumina from the former.

References Cited by the Examiner

UNITED STATES PATENTS

| | | | |
|---|---|---|---|
| 1,777,571 | 10/30 | McCullough | 156—172 |
| 2,005,897 | 6/35 | Knowles | 154—90 XR |
| 2,272,342 | 2/42 | Hyde. | |
| 2,674,678 | 4/54 | Wakefield | 117—129 XR |
| 2,676,899 | 4/54 | Hackley | 117—129 XR |
| 2,699,415 | 1/55 | Nachtman | 156—173 |
| 2,844,693 | 7/58 | Rigterink | 117—231 |
| 2,848,794 | 8/58 | Roth | 117—231 |
| 2,974,388 | 3/61 | Ault | 25—156 |
| 3,056,184 | 10/62 | Blaha | 25—156 |

EARL M. BERGERT, *Primary Examiner.*

CARL F. KRAFFT, *Examiner.*